United States Patent
Hou et al.

(10) Patent No.: US 9,352,803 B2
(45) Date of Patent: *May 31, 2016

(54) SIDEWALL HOVERCRAFT WITHOUT CUSHION FAN

(75) Inventors: Liang Hou, Chongqing (CN); Fengqin Jia, Chongqing (CN); Yuhan Hou, Chongqing (CN)

(73) Assignee: CHONGQING YUHAN MARINE TECHNOLOGY CO., LTD, Chongqing (CN)

( * ) Notice: Subject to any disclaimer, the term of this patent is extended or adjusted under 35 U.S.C. 154(b) by 32 days.

This patent is subject to a terminal disclaimer.

(21) Appl. No.: 14/233,760

(22) PCT Filed: Aug. 29, 2011

(86) PCT No.: PCT/CN2011/079078
§ 371 (c)(1),
(2), (4) Date: Jan. 20, 2014

(87) PCT Pub. No.: WO2013/029229
PCT Pub. Date: Mar. 7, 2013

(65) Prior Publication Data
US 2014/0182507 A1 Jul. 3, 2014

(51) Int. Cl.
*B63B 1/32* (2006.01)
*B63B 1/20* (2006.01)
*B63B 1/04* (2006.01)
(Continued)

(52) U.S. Cl.
CPC . *B63B 1/20* (2013.01); *B63B 1/042* (2013.01); *B63B 1/32* (2013.01); *B63H 5/02* (2013.01); *B63H 5/08* (2013.01); *B63H 7/02* (2013.01); *B63B 2001/207* (2013.01); *B63H 5/07* (2013.01); *Y02T 70/12* (2013.01)

(58) Field of Classification Search
CPC .............. B63B 1/20; B63B 5/08; B63B 1/32; B63B 7/02; B63B 5/02; B63B 2001/207; B63B 5/07; B63B 1/18; B63B 2001/204; Y02T 70/12; Y02T 70/122
USPC ....... 114/274, 288, 289, 290, 271, 67 R, 67 A
See application file for complete search history.

(56) References Cited

U.S. PATENT DOCUMENTS 3,403,654 A * 10/1968 Wilson ........................ 440/12.56
3,937,164 A *  2/1976 Austin ..................... B63B 1/18
                                                    114/288

(Continued)

FOREIGN PATENT DOCUMENTS

| CN | 1642806 | 7/2005 |
| FR | 2787758 | 6/2000 |
| WO | 8605756 | 10/1986 |

*Primary Examiner* — Anthony Wiest

(57) ABSTRACT

A sidewall planing boat includes: a body; sub-bodies; and a power device; wherein the two sub-bodies are mounted on a front portion of the body and are symmetrically provided at two sides of the body; bottom surfaces of the sub-bodies are lower than a bottom surface of the body; wherein rigid sidewalls are symmetrically mounted on side surfaces of the body, rigid sub-sidewalls are symmetrically mounted on side surfaces of the sub-body; portions of the sidewalls and the sub-sidewalls which extend to a bottom of the sidewall planing boat are inserted into water for forming three lifting areas with front openings with the bottom; wherein the power device is mounted on the body and/or the sub-bodies. With the foregoing structure, water resistance of the sidewall planing boat is decreased and a sailing speed in increased.

7 Claims, 3 Drawing Sheets

(51) Int. Cl.
  *B63H 5/02* (2006.01)
  *B63H 5/08* (2006.01)
  *B63H 7/02* (2006.01)
  *B63H 5/07* (2006.01)

(56) References Cited

U.S. PATENT DOCUMENTS

| | | | |
|---|---|---|---|
| 3,952,678 A | 4/1976 | Weston | |
| 4,091,761 A * | 5/1978 | Fehn | 114/290 |
| 4,644,890 A | 2/1987 | Lott | |
| 6,066,012 A * | 5/2000 | Nagle | 440/75 |
| 6,085,677 A * | 7/2000 | Bell | B63B 1/12 114/61.1 |
| 6,216,622 B1 * | 4/2001 | Lindstrom | B63B 1/042 114/288 |
| 7,654,211 B2 * | 2/2010 | Maloney et al. | 114/67 R |
| 2009/0178602 A1 | 7/2009 | Gundersen | |

* cited by examiner

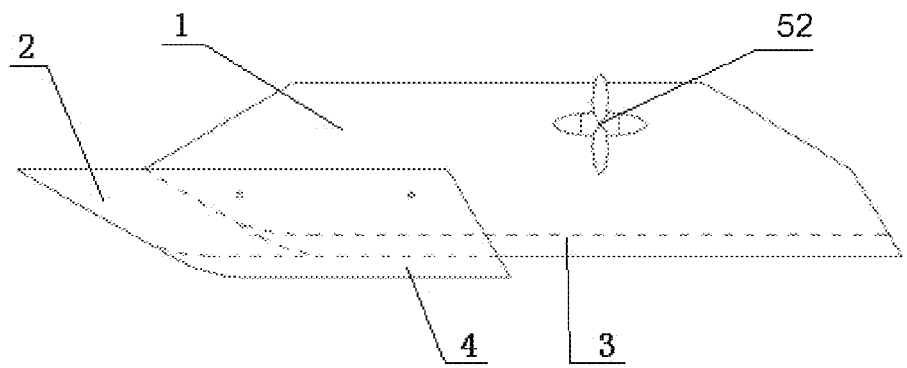
Fig. 1
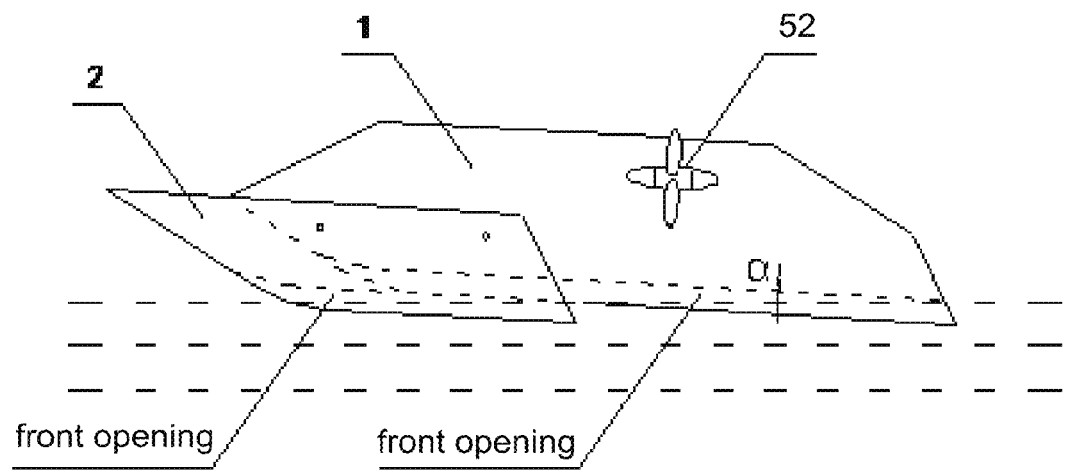
front opening   front opening
Fig. 2
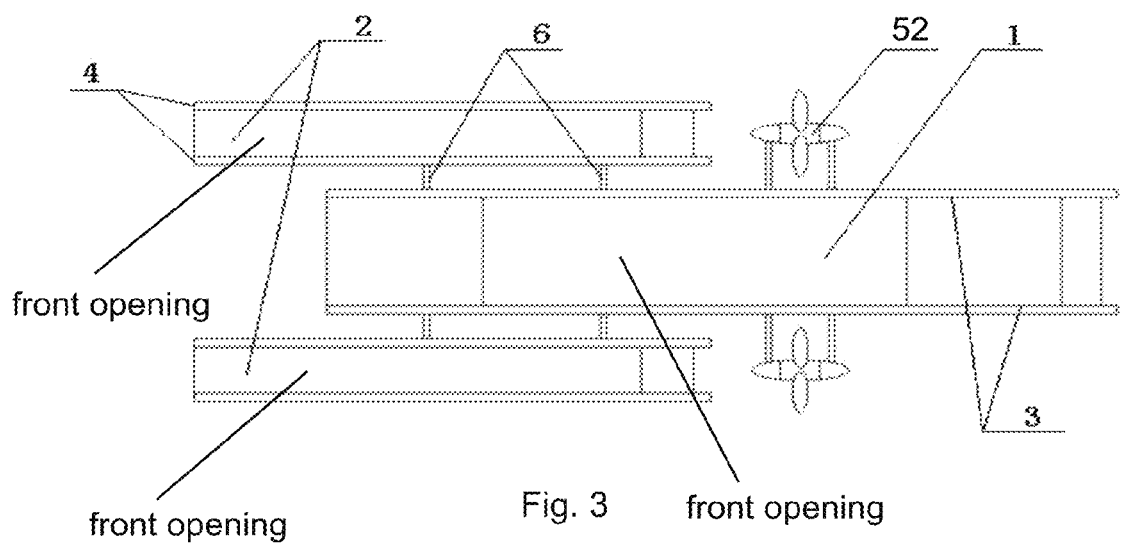
front opening
front opening   Fig. 3   front opening

SIDEWALL HOVERCRAFT WITHOUT CUSHION FAN

CROSS REFERENCE OF RELATED APPLICATION

This is a U.S. National Stage under 35 U.S.C. 371 of the International Application PCT/CN2011/079078, filed Aug. 29, 2011.

BACKGROUND OF THE PRESENT INVENTION

1. Field of Invention

The present invention relates to ships or other watercrafts, and more particularly to a trimaran with a planing surface and a rigid sidewall.

2. Description of Related Arts

In the past thousands of years, for conquering rivers and lakes, people living on land have been tirelessly researching watercrafts. In order to reduce the resistance of sailing, planing boats, hovercraft, and other kinds of ships have been designed and improved.

The planing boat is a high-speed ship whose weight is mainly supported by hydrodynamic pressure to the body from water when sailing. The planing boat is shorter and wider than the conventional displacement ship, and the bottom is relatively flat. A joint of bottom and side plate of the conventional ship is usually a sharp corner which forms a sharp bilge, wherein this kind of ship is also called a sharp bilge boat. Because the planing boat relies on hydrodynamic pressure acting on a part of the hull for lifting most of the hull out of the water when sailing with a high-speed, a normal draft thereof is required not to be too deep when the boat is in a non-planing state. Otherwise, it will be difficult to start planing. Therefore, the planing boat is not suitable for being enlarged. In addition, the sea state has a great effect on the planing boat when sailing. Because the direct impact of wave on the hull is large, when the sea state is high, the boat will jump like a dolphin, so that the seaworthiness is seriously lowered.

There are two main types of hovercrafts: cushion hovercraft and sidewall hovercraft. During sailing, the whole hull is lifted out of the water by a high-pressure air cushion. Because of no water resistance, not only sailing speed is high, but also the adaptability is sufficient. However, the hovercraft needs more lifting power, which may be up to 50% of a total power, when sailing. As a result, operation economy of the hovercraft is greatly decreased.

SUMMARY OF THE PRESENT INVENTION

An object of the present invention is to provide a sidewall planing boat, wherein the sidewall planing boat is a trimaran of high speed; rigid sidewalls extending into water are mounted on sides of a body and sub-bodies thereof; mounting positions cooperates with mounting heights of the body and sub-bodies in such a manner that a water-approaching angle of a is formed between a bottom surface of the sidewall planing boat and the water. During sailing, three high-pressure air cushions are formed under the body and the sub-bodies for stably supporting the sidewall planing boat. Not only a shortcoming of poor seaworthiness of the conventional planing boat is overcome, but also a shortcoming that a large lifting power is needed by the hovercraft is overcome. That is to say, the present invention takes advantage of a simple structure of the conventional planing boat as well as small sailing resistance of the hovercraft. During high-speed sailing, a posture is stable and the sidewall planing boat will not jump like a dolphin.

Accordingly, in order to accomplish the above object, the present invention provides a sidewall planing boat, comprising:

a body;
sub-bodies; and
a power device;

wherein the two sub-bodies are mounted on a front portion of the body and are symmetrically provided at two sides of the body; bottom surfaces of the sub-bodies are lower than a bottom surface of the body;

wherein rigid sidewalls are symmetrically mounted on side surfaces of the body, rigid sub-sidewalls are symmetrically mounted on side surfaces of the sub-body; portions of the sidewalls and the sub-sidewalls which extend to a bottom of the sidewall planing boat are inserted into water for forming three lifting areas with front openings with the bottom;

wherein the power device is mounted on the body and/or the sub-bodies.

Preferably, the bottom surface of the body and the bottom surfaces of the sub-bodies are flat and parallel to each other.

Preferably, the sidewalls are longitudinally continuous flat plates parallel to each other; the sub-sidewalls are also longitudinally continuous flat plates parallel to each other; the sidewalls are parallel to the sub-sidewalls.

Preferably, a front portion of the bottom surface of the body and front portions of the bottom surfaces of the sub-bodies are raised up for forming a forerake bow portion, in such a manner that a better air-flotation ability is obtained.

Preferably, the power device is embodied as one of the follows. The power device comprises water propellers mounted on a rear portion of the body and/or rear portions of the sub-bodies. The power device comprises air propellers mounted on a rear portion of the body and/or the side surfaces of the body. The power device comprises paddle wheels mounted on the side surfaces of the body.

Preferably, an outfitting is mounted on the body, comprising a rudder for sailing.

These and other objectives, features, and advantages of the present invention will become apparent from the following detailed description, the accompanying drawings, and the appended claims.

BRIEF DESCRIPTION OF THE DRAWINGS

FIG. 1 is a sketch view of a sidewall planing boat according to a preferred embodiment of the present invention.

FIG. 2 is a sketch view of the sidewall planing boat when sailing according to the preferred embodiment of the present invention.

FIG. 3 is a top view of the sidewall planing boat when sailing according to the preferred embodiment of the present invention.

REFERENCE NUMBERS OF ELEMENTS

Figure 4:
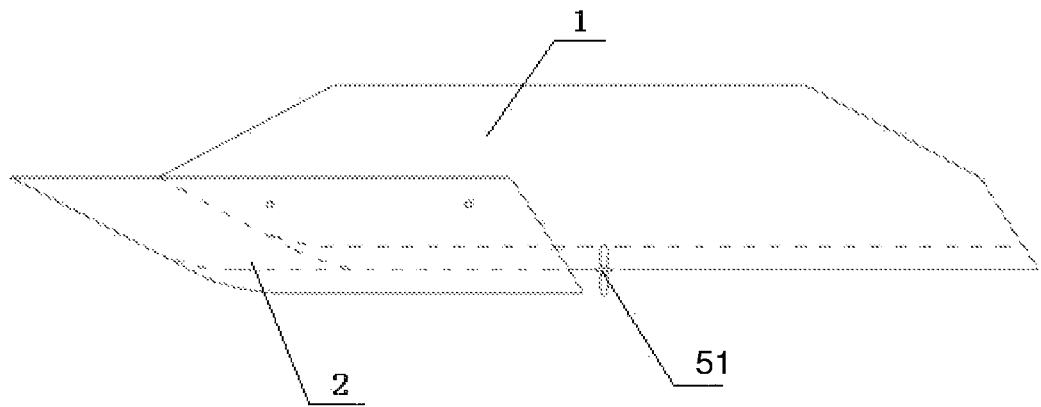
FIG. 4 is a sketch view of the sidewall planing boat with a power device comprising water propellers mounted on rear portions of sub-bodies according to the preferred embodiment of the present invention.
Figure 5:
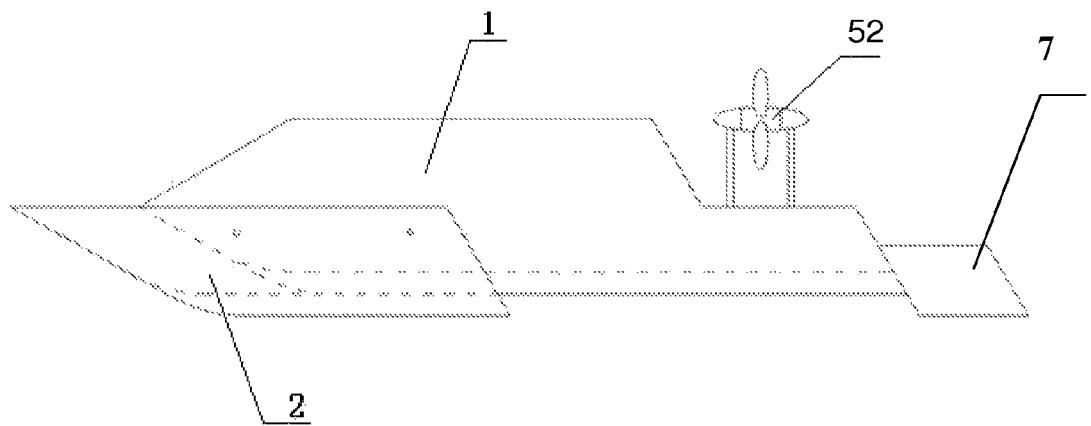
FIG. 5 is a sketch view of the sidewall planing boat with a power device comprising air propellers mounted on a top portion of a body according to the preferred embodiment of the present invention.
Figure 6:
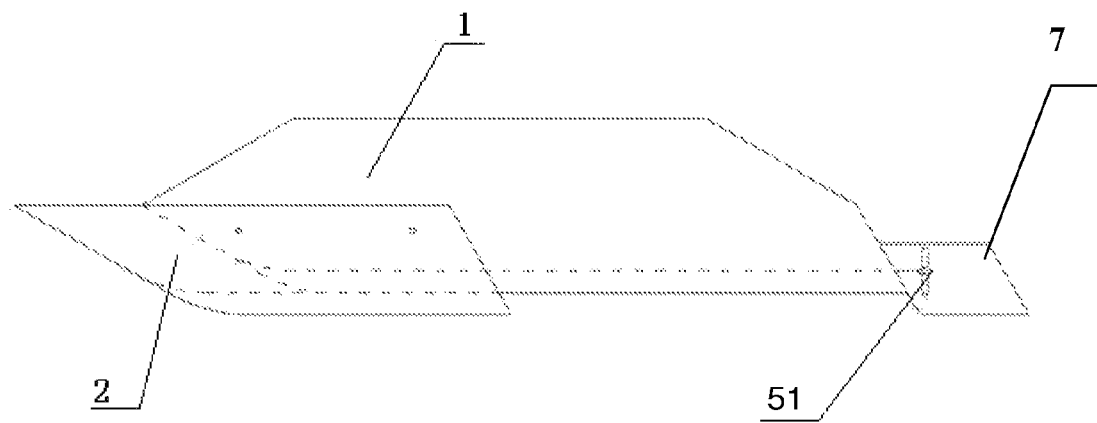
FIG. 6 is a sketch view of the sidewall planing boat with a power device comprising water propellers mounted on a rear portion of the body according to the preferred embodiment of the present invention.
Figure 7:
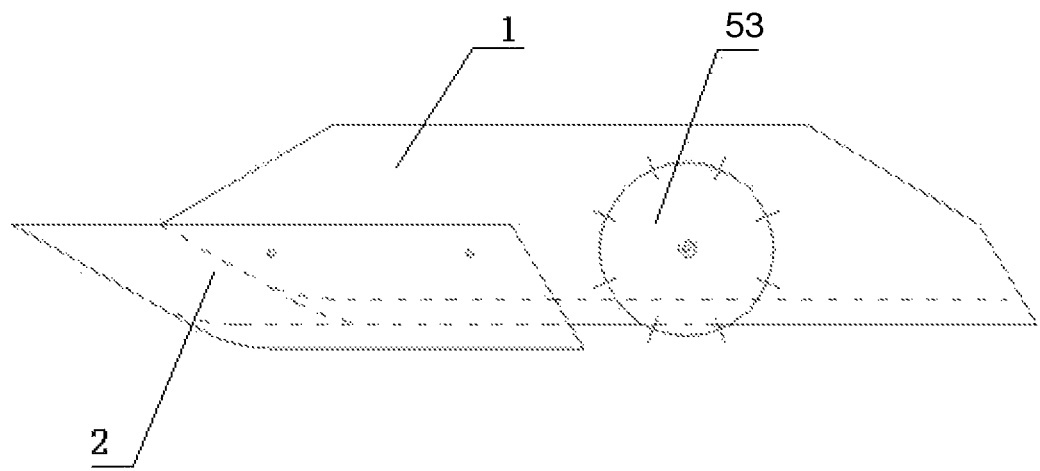
FIG. 7 is a sketch view of the sidewall planing boat with a power device comprising paddle wheels mounted on two side of the body according to the preferred embodiment of the present invention.

1—body, 2—sub-body, 3—sidewall, 4—sub-sidewall, 51—water propeller, 52—air propeller, 53—paddle wheel, 6—connecting bridge, 7—rudder

DETAILED DESCRIPTION OF THE PREFERRED EMBODIMENT

Referring to the drawings, the present invention is further illustrated.

Accordingly, a sidewall planing boat according to a preferred embodiment of the present invention is illustrated, comprising:

a body 1;
sub-bodies 2; and
a power device;

wherein the two sub-bodies 2 are mounted on a front portion of the body 1 and are symmetrically provided at two sides of the body 1; bottom surfaces of the sub-bodies 2 are lower than a bottom surface of the body 1;

wherein rigid sidewalls 3 are symmetrically mounted on side surfaces of the body 1, rigid sub-sidewalls 4 are symmetrically mounted on side surfaces of the sub-body 2; portions of the sidewalls 3 and the sub-sidewalls 4 which extend to a bottom of the sidewall planing boat are inserted into water during sailing for forming three lifting areas with front openings with the bottom;

wherein the power device is mounted on the body 1 and/or the sub-bodies 2.

Preferably, the bottom surface of the body 1 and the bottom surfaces of the sub-bodies 2 are flat and parallel to each other.

Preferably, the sidewalls 3 are longitudinally continuous flat plates parallel to each other; the sub-sidewalls 4 are also longitudinally continuous flat plates parallel to each other; the sidewalls 3 are parallel to the sub-sidewalls 4.

Preferably, a front portion of the bottom surface of the body 1 and front portions of the bottom surfaces of the sub-bodies 2 are raised up for forming a forerake bow portion. The sub-body 2 is connected to the body 1 through a connecting bridge 6.

The sidewall planing boat has a trimaran structure, the two sub-bodies 2 are symmetrically provided at front portions of the two sides of the body 1. The bottom surface of the body 1 and the bottom surfaces of the sub-bodies 2 are flat and parallel to each other. The bottom surfaces of the sub-bodies 2 are lower than the bottom surface of the body 1.

Referring to the FIG. 2 of the drawings, dotted lines are parallel to water surface. When the boat is floating in the water, the bow of the body 1 is raised by the sub-bodies 2 due to buoyancy. As a result, a water-approaching angle of a is formed between the bottom surface of the body 1 and the water surface, which is illustrated as an angle between the dotted lines in the FIG. 2. Meanwhile, the longitudinally continuous rigid sidewalls 3 which extend into the water are mounted on the side surfaces of the body 1. When the boat begins sailing with a high speed, the pocket-like lifting area with the front opening is formed by the rigid sidewalls 3 and the bottom of the boat for compressing air taken through the front opening. Similarly, sub-sidewalls 4, which are similar to the sidewalls 3, are mounted on the side surfaces of the sub-bodies 2. During the sailing of the trimaran, high-pressure air cushions are formed under the body 1 and the sub-bodies 2 at a same time for stably supporting the boat above the water like a tripod, in such a manner that resistance of the water is effectively decreased, energy consumption is lowered, and the sailing speed is significantly increased.

Preferably, the power device is embodied as one of the follows. The power device comprises water propellers 51 mounted on a rear portion of the body 1 and/or rear portions of the sub-bodies 2. The power device comprises air propellers 52 mounted on a rear portion of the body 1 and/or the side surfaces of the body 1. The power device comprises paddle wheels 53 mounted on the side surfaces of the body 1.

Preferably, an outfitting is mounted on the body 1 for sailing, wherein sailing direction is controlled by a rudder 7 mounted on the rear portion of the body 1 or controlled by different rotation speeds of the power device mounted on the side surfaces of the body 1.

Technical effects according to the preferred embodiment of the present invention are undoubted. On one hand, the longitudinal sidewalls are mounted on bottom portions of the both sides of the boat for forming the high-pressure air cushions without disturbing the water, in such a manner that energy is saved. Therefore, the shortcomings that energy is wasted by the conventional planing boat due to a sharp bilge structure which drains the water under the boat to the sides during the high-speed sailing and disturbs the water is overcome. On the other hand, the three high-pressure air cushions are formed under the boat according to the present invention for stably supporting the boat above the water, wherein technical effects of the hovercraft is reached without a cushion fan with high energy consumption, the structure is simple, and propulsive efficiency is high. It is proved by experiments that not only a speed index of the sidewall planing boat is significantly improved, but also buoyancy, stability, anti-sinking, anti-wave, maneuverability and economy indexes are excellent. Furthermore, the sailing speed is up to 80 knots or more.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A sidewall planing boat, comprising:
a body;
sub-bodies; and
a power device;
wherein said two sub-bodies are mounted on a front portion of said body and are symmetrically provided at two sides of said body; wherein a bottom surface of said body and bottom surfaces of said sub-bodies are flat and parallel to each other; said bottom surfaces of said sub-bodies are lower than said bottom surface of said body;
wherein rigid sidewalls are symmetrically mounted on side surfaces of said body, rigid sub-sidewalls are symmetrically mounted on side surfaces of said sub-body; portions of said sidewalls and said sub-sidewalls which extend downwards are inserted into water for forming three lifting areas with front openings with said bottom surfaces of said sub-bodies and said bottom surface of said body, and during sailing, three air cushions are formed under said body and said sub-bodies for stably supporting said sidewall planing boat;

wherein said power device is mounted on said body and/or said sub-bodies.

2. The sidewall planing boat, as recited in claim 1, wherein a front portion of said bottom surface of said body and front portions of said bottom surfaces of said sub-bodies are raised up for forming a forerake bow portion.

3. The sidewall planing boat, as recited in claim 1, wherein said sidewalls are longitudinally continuous flat plates parallel to each other; said sub-sidewalls are also longitudinally continuous flat plates parallel to each other; said sidewalls are parallel to said sub-sidewalls.

4. The sidewall planing boat, as recited in claim 1, wherein said power device comprises water propellers mounted on a rear portion of said body and/or rear portions of said sub-bodies.

5. The sidewall planing boat, as recited in claim 1, wherein said power device comprises air propellers mounted on a rear portion of said body and/or said side surfaces of said body.

6. The sidewall planing boat, as recited in claim 1, wherein said power device comprises paddle wheels mounted on said side surfaces of said body.

7. The sidewall planing boat, as recited in claim 1, wherein an outfitting is mounted on said body.

* * * * *